(12) United States Patent
Ramirez-Alcala et al.

(10) Patent No.: US 12,048,968 B2
(45) Date of Patent: Jul. 30, 2024

(54) DEVICE AND METHOD FOR DRILLING WITH AUTOMATIC DRILLING PARAMETERS ADAPTATION

(71) Applicant: AIRBUS OPERATIONS SL, Madrid (ES)

(72) Inventors: Carlos Ramirez-Alcala, Madrid (ES); Juan Manuel Vazquez Martinez, Madrid (ES); Juan Maria Gonzalez Leal, Madrid (ES); Jorge Salguero Gomez, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 227 days.

(21) Appl. No.: 17/702,455

(22) Filed: Mar. 23, 2022

(65) Prior Publication Data

US 2022/0341311 A1   Oct. 27, 2022

(30) Foreign Application Priority Data

Mar. 24, 2021   (EP) ..................... 21382241

(51) Int. Cl.
*B23B 35/00*   (2006.01)
*B23Q 15/013*   (2006.01)
*B23Q 15/08*   (2006.01)
*B23Q 17/09*   (2006.01)

(52) U.S. Cl.
CPC ............ *B23B 35/00* (2013.01); *B23Q 15/013* (2013.01); *B23Q 15/08* (2013.01); *B23Q 17/0961* (2013.01)

(58) Field of Classification Search
CPC .............. B23B 35/00; B23B 2260/062; B23B 2260/128; B23B 39/00; B23Q 15/013; B23Q 15/08; B23Q 17/0961; B23Q 15/12; G05B 2219/37344; G05B 2219/41109;

(Continued)

(56) References Cited

U.S. PATENT DOCUMENTS 1,777,849 A * 10/1930 Hoopes ................ G04D 3/0017
                                                                            968/692
2,835,472 A *  5/1958 Osborn .................... E21B 7/046
                                                                            175/218

(Continued)

FOREIGN PATENT DOCUMENTS

CA    2804863 A1 *  1/2012   ............. B23B 49/00
CN  115122150 A  *  9/2022   ............. B23B 35/00
EP    2391483 B1 *  6/2013   ............. B23B 45/02

OTHER PUBLICATIONS

Extended European Search Report for EP Application No. 21382241.4 dated Sep. 23, 2021, 7 pages.

*Primary Examiner* — Robert F Long
(74) *Attorney, Agent, or Firm* — Nixon & Vanderhye P.C.

(57) ABSTRACT

A drilling machine and a drilling method including drilling a first bore in a material with a drilling machine by applying a torque to a drilling tool for imparting a rotation at a first rotational speed to the drilling tool, and applying a thrust to the drilling tool for advancing the drilling tool at a first feed speed into the material, wherein a drilling parameter is measured while drilling the first bore, and a second rotational speed and a second feed speed are determined based on the drilling parameter, then drilling a second bore at the second rotational speed and at the second feed speed.

11 Claims, 5 Drawing Sheets

(58) Field of Classification Search
CPC ...... G05B 2219/45129; G05B 19/4065; G05B 2219/49099
USPC ............. 173/1–2, 6, 13, 18–20, 184, 29–31, 173/38–39, 45–53
See application file for complete search history.

(56) References Cited

U.S. PATENT DOCUMENTS

| | | | | |
|---|---|---|---|---|
| 3,173,315 A * | 3/1965 | Fuldner | ................ | G05B 19/373 |
| | | | | 91/170 R |
| 3,635,570 A * | 1/1972 | DeGelleke | ............... | B23Q 3/06 |
| | | | | 408/43 |
| 4,121,745 A * | 10/1978 | Smith | ....................... | B25C 1/06 |
| | | | | 173/13 |
| 4,854,786 A * | 8/1989 | Alexander | ......... | G05B 19/4163 |
| | | | | 409/187 |
| 4,964,558 A * | 10/1990 | Crutcher | ................... | B25C 1/06 |
| | | | | 173/124 |
| 5,022,798 A | 6/1991 | Eckman | | |
| 5,134,789 A * | 8/1992 | Godau | ................... | D06B 21/00 |
| | | | | 34/636 |
| 5,208,761 A * | 5/1993 | Michigami | ............. | B23B 41/00 |
| | | | | 483/12 |
| 5,558,476 A * | 9/1996 | Uchida | ................ | B25H 1/0064 |
| | | | | 408/11 |
| 5,564,455 A * | 10/1996 | Keating | ................... | B23Q 5/06 |
| | | | | 60/426 |
| 5,704,738 A * | 1/1998 | Sugino | ................. | B23B 31/083 |
| | | | | 408/239 R |
| 5,709,276 A * | 1/1998 | Lee | ........................ | E21B 7/046 |
| | | | | 175/122 |
| 7,997,467 B2 * | 8/2011 | Hirabayashi | .............. | B25C 1/06 |
| | | | | 227/156 |
| 9,988,060 B2 * | 6/2018 | Slurink | ................... | B61B 13/04 |
| 11,373,296 B1 * | 6/2022 | Khashaba | ................ | B23B 35/00 |
| 2004/0253064 A1 | 12/2004 | Koslowski et al. | | |
| 2007/0102471 A1 * | 5/2007 | Gross | ....................... | B25C 1/06 |
| | | | | 227/131 |
| 2009/0250500 A1 * | 10/2009 | Brendel | .................... | B25C 5/15 |
| | | | | 227/132 |
| 2009/0314816 A1 * | 12/2009 | Schroeder | ........... | B21D 43/006 |
| | | | | 226/176 |
| 2011/0022032 A1 * | 1/2011 | Zemlok | ........... | A61B 17/07207 |
| | | | | 606/1 |
| 2011/0114345 A1 * | 5/2011 | Schlesak | ................. | B25F 5/024 |
| | | | | 173/1 |
| 2011/0135412 A1 * | 6/2011 | Duncan | .................. | B28D 1/041 |
| | | | | 408/72 R |
| 2013/0000980 A1 * | 1/2013 | Dolgin | .................... | E21B 7/046 |
| | | | | 175/45 |
| 2013/0189043 A1 | 7/2013 | Uchiuzo et al. | | |
| 2013/0199812 A1 * | 8/2013 | Dangelmaier | ........ | F02D 31/001 |
| | | | | 173/179 |
| 2013/0338669 A1 * | 12/2013 | Brianza | .............. | A61B 17/1664 |
| | | | | 606/80 |
| 2014/0251688 A1 * | 9/2014 | Turner | ..................... | G01V 9/00 |
| | | | | 702/9 |
| 2014/0360330 A1 * | 12/2014 | Casagranda | ........... | B23D 47/06 |
| | | | | 83/436.4 |
| 2016/0200000 A1 * | 7/2016 | Koslowski | .............. | B23B 51/04 |
| | | | | 173/1 |
| 2017/0190041 A1 * | 7/2017 | Dey, IV | ................... | F16F 9/535 |
| 2018/0085117 A1 * | 3/2018 | Shelton, IV | ........ | A61B 18/1445 |
| 2018/0111259 A1 * | 4/2018 | Takeda | .................... | H02K 7/145 |
| 2018/0119492 A1 * | 5/2018 | Nelson | .................... | E21B 7/025 |
| 2019/0059888 A1 * | 2/2019 | Shelton, IV | ........ | A61B 17/0684 |
| 2019/0148923 A1 * | 5/2019 | King | ..................... | H02G 1/081 |
| | | | | 254/134.3 R |
| 2019/0200989 A1 * | 7/2019 | Burbank | .......... | A61B 17/07207 |
| 2020/0138435 A1 * | 5/2020 | Shelton, IV | ......... | A61B 17/105 |
| 2020/0305865 A1 * | 10/2020 | Shelton, IV | ..... | A61B 17/07207 |
| 2020/0325763 A1 * | 10/2020 | Veltman | .................. | G05B 15/02 |
| 2021/0162513 A1 * | 6/2021 | Su | ....................... | G05B 19/4166 |
| 2021/0229254 A1 * | 7/2021 | Merello | .................. | B23B 39/14 |
| 2021/0240145 A1 * | 8/2021 | Abbott | .................... | B25F 5/001 |
| 2023/0017771 A1 * | 1/2023 | Zhu | .................... | A61B 17/1626 |

* cited by examiner

DEVICE AND METHOD FOR DRILLING WITH AUTOMATIC DRILLING PARAMETERS ADAPTATION

RELATED APPLICATION

This application incorporates by reference and claims priority to European Patent Application 21382241-4, filed Mar. 24, 2021.

TECHNICAL FIELD

The invention relates to a device and method for drilling holes in a material. In particular, the invention relates to drilling methods that control drilling forces to extend the life span of a drilling tool and optimize hole key characteristics.

BACKGROUND

In industry, drilling machines are usually set with predetermined fixed parameters which do not change from drilled bore to bore, or during the life span of a drilling tool, e.g., drill bit, attached to the drilling machine. These fixed predetermined parameters may be specific to material layers to be drilled. The fixed predetermined parameters are determined during tests performed in a laboratory and under industrial conditions. The tests validate the planned life span of the drilling tool and confirm adequate performance of the drilling tool during the planned life span.

Once a drilling tool reaches its predetermined life span, the tool is replaced regardless of whether it is at risk of failure and may be safely used for a longer period. Replacing drilling tools that have remaining useful life results in waste due to disposal of the drilling tools and increased expenditures due to buying new tools for existing tools that is still usable.

Moreover, a bore made with a new drilling tool and a bore made with a worn drilling tool may present deviations, affecting the repeatability of the drilling process. The quality of bores made with a worn drilling tool is lower than the quality made with a new drilling tool. For example the Burr height is higher on bore made with worn drilling tools than on bores made with new drilling tools. The Burr height represents the size, e.g., height, of undesired remaining material remaining at or near a bore after a drilling operation.

If the drilling tool wears fasters than expected, the drilling tool may be used past its actual life span and may potentially break or otherwise fail. Historically, manual and pneumatic drilling machines do not provide for monitoring of the drilling process because such machines comprised only one engine performing all the movements needed for the process, in particular axial and radial movements. More recent automatic and semi-automatic electric drilling machines have an engine for the axial movement (thrust) of the drilling tool and another engine for the radial movement (rotation) of the drilling tool. Two engines allows for independent control of the drilling forces in thrust and in rotation.

Monitoring drilling processes is challenging in vibration assisted drilling methods and machines. In such methods and machines, the linear displacement of the drilling tool is controlled based on specific conditions of vibration, such as amplitude and frequency of the vibrations. This technique is widely used in the industry to improve the evacuation of chips of material produced during the drilling process. The vibration assisted drilling method decrease drilling duration and therefore undesirable wear effects due to friction and elevated temperatures on the drilling tool.

SUMMARY

The invention may be embodied as a drilling machine and method to improve the life span of drilling tools. The invention also be applied to provide a drilling machine and method that drills high quality bores at all stages of the life drilling tool life span.

The invention may be embodied to provide a drilling machine and method which provide a high repeatability of the drilling process.

The invention may be embodied to provide a drilling machine and method which limit the drilling tool wear and maximizes the life span of a drilling tool, and therefore provide for a low-cost drilling process as well as limited waste.

The invention may be embodied in a simple drilling method and machine, which may allow to retrofit existing drilling machines.

The invention may be embodied as a drilling method comprising: (i) drilling at least one first bore in a material with a drilling machine by applying a torque to a drilling tool to impart rotation at a predetermined first rotational speed to the drilling tool, and applying a thrust to the drilling tool to advance the drilling tool at a predetermined first feed speed into the material, (ii) measuring at least one drilling parameter representative of at least one of the torque and the thrust while drilling the at least one first bore, (iii) determining at least one of a second rotational speed and a second feed speed based on the drilling parameter measured while drilling the first bore, and (iv) drilling a second bore after drilling the at least one first bore, by applying at least one of: a torque to the drilling tool for imparting a rotation at the second rotational speed to the drilling tool, and a thrust to the drilling tool for advancing the drilling tool at the second feed speed into the material.

The invention may be embodied as a method that monitors drilling forces and, starting from pre-determined initial drilling parameters, the method adapts cutting parameters according to wear of a drilling tool and the corresponding evolution of the process forces. The method monitors and transposes signals captured from the motors of the drilling machine, which induce the rotation and feed speed of the tool into axial force and momentum respectively, analyzes the signals, such as by integrating one or more signals, to calculate an adaptive factor to the drilling parameters and decide whether it is applicable to reduce the drilling efforts, thus increasing the useful life of the tool and the quality and repeatability of the holes obtained.

In a method according to an embodiment of the invention, the wear of the drilling tool is accounted to from bore to bore by adjusting at least one of the rotational speeds and feed speeds. The wear of the drilling tool is controlled and minimized by adapting the drilling speeds (thrust speed or rotational speed) based on the monitoring of the drilling forces (torque and thrust applied) measured during the drilling of previous holes. The drilling tool wear is characterized by the drilling process forces thrust and torque) measured and these forces can be modified when drilling subsequent bores by adapting or changing the drilling speeds. By adapting drilling speeds based on the drilling forces or drilling parameters measured during drilling a prior bore, the drilling tool life span may be extended.

An initial drilling speed of a drilling tool may be based on drilling tool validation tests. This ensures correct process performance at least for drilling the first bore by the drilling tool. Drilling speeds are adapted to operate at different set points for subsequent bores based on the wear of the drilling tool to extend the life of the drilling tool, as compared with the processes using fixed drilling parameters/speeds. Because the set point for rotational speed and feed speed are adjusted for subsequent bores, the drilling tool wears slowly as compared to methods in which the rotational speed and the feed speed are imposed without accounting for the drilling tool wear. Because the drilling speed is adjusted in view of the wear of the drilling tool, the life of the drilling tool is extended which results in lower costs for drilling tools and fewer drilling tools to discard as waste.

In addition, drilling forces applied to the drilling tool influence drilling characteristics. Adapting the drilling parameters of force or speed according to an embodiment of the invention allows for the drilling of bores (holes) of high manufacturing quality. In particular, the inventors recorded drilling parameters such as diameter, roughness and burr height of each bore is particularly consistent all along the drilling tool's life span.

The method adapts at least one of the feed speed or rotational speed response to the monitored drilling forces in axial direction (thrust) and/or radial direction (torque). Through monitoring, the method makes use of the signals coming from the drilling machine's sensors in a feedback loop to automatically set new drilling speeds. This feedback loop is operational during the entire life span of the drilling tool. Drilling machines with a first engine applying a feed speed (thrust movement) to the drilling tool and a second engine independent from the first engine for applying a rotational speed to the drilling tool allow for independent control of rotational speed and feed speed of the drilling tool. Drilling machine with first and second engines allow for the independent measurement of the thrust force in axial direction and torque in radial direction.

The invention may be embodied in a method is adapted to vibrations assisted drilling.

The method may be applicable drilling in various types of material to be drilled. In some cases, the mechanical properties of a given material to be drilled such as its hardness may change due to variations in its manufacturing process. A method according to an embodiment of the invention adapts, in real time, the drilling rotational speed or the feed speed (rate) as the drilling tool moves through the material with varying hardness levels.

The material to be drilled may be any material that may be drilled. The only hypothesis is that, apart from very slight variations in the material's characteristics as previously mentioned, the material remains the same along a plurality of bores. The invention however applies to numerous types of materials such as metal alloys, composites, and wood.

The drilling tool (or "cutting tool" or "drill bit") is an instrument with an edged or pointed end for making holes in a material by rotation. The drilling tool may have several types of geometries and be made in various materials.

The rotational speed of the drilling tool may be expressed as a number of revolutions per unit of time. The rotational speed is proportional to the radial forces, which in turn are proportional to drilling torque applied to the drilling tool.

The feed speed is the speed at which the drilling tool penetrates in the material. In some embodiments, the feed speed may be proportional to the rotational speed. The feed speed may be expressed in millimeters per revolution for example. It is linked to the axial forces, which in turn are directly linked to the drilling thrust.

The feed stroke is the maximum depth reached by the drilling tool when drilling a bore. Usually, for drilling a through-hole, the feed stroke is longer than the material thickness.

The term "bore" designates the result of a drilling action with a drilling tool in a material. The term bore is synonymous with drilled hole.

At least one drilling parameter representative of at least one of the torque and the thrust may be measured while drilling at least a first bore. By "at least the first bore", it is, hereby and in the whole description and claims, understood that the drilling parameter(s) may be measured while drilling one or a plurality of "first" (or "initial") bores before adjusting the torque and/or thrust for drilling a "second" (or "subsequent") bore. The "second" bore may itself become a "first" bore when the method is repeated.

In a first step, a first bore is drilled. For drilling this first bore a predetermined first rotational speed and a predetermined first feed speed are imparted to the drilling tool. This predetermined drilling speeds may be determined by preliminary tests run in laboratory and in industrial conditions. During such test, feasibility of the process in terms of repeatability, is demonstrated together with other characteristics. The minimum drilling forces at which the process has the required repeatability may be obtained by laboratory tests. On the other hand, industrial condition tests may provide the maximum drilling forces at which, within the drilling tool life span, the process provides the required repeatability with the same drilling parameters setting as in the validation tests.

At least one drilling value for a drilling parameter representative of at least one of the torque and the thrust is acquired while drilling the first bore. A plurality of drilling values of the drilling parameter may be acquired while drilling a bore. To achieve this monitoring, the method records signals from drilling machine systems for each drilling tool movement direction and for each material layer.

The method according to the invention transposes digital signals of drilling parameters received into discreet or continuous drilling values corresponding to a thrust and a torque. These drilling values may then be compared with the minimum value and the maximum value obtained in the laboratory and industrial tests described before. The method thus determines whether the drilling speeds must be adapted for the subsequent holes depending on the drilling values obtained by measurement.

The one or more drilling values are used to calculate a second rotational speed and/or a second feed speed. The calculation(s) of the second rotational speed and/or the second feed speed is/are made based on the one or more drilling values and, respectively, the first rotational speed and/or the first feed speed. In some instances, the drilling values acquired upon measuring the drilling parameter result in that the second rotational speed and/or a second feed speed may be identical to the first rotational speed (and/or respectively the first feed speed).

The drilling values may undergo a first processing such as an integration or an average when a plurality of drilling values are acquired for a same drilling parameter at different instants during the drilling of a same bore. An adaptive factor may be calculated for the drilling of subsequent holes, based on the signal integration.

The method according to the invention may provide alerts about a need to change a drilling tool when at least one of the drilling forces (thrust or torque) exceeds a predetermined limit or when the process is considered to be inefficient in terms of cost or drilling duration according to production requirements.

A first drilling parameter may be an electrical current, also referred to as current, supplied to an electrical motor of the drilling machine adapted for imparting a torque to the drilling tool.

A second drilling parameter may be an electrical current supplied to an electrical motor of the drilling machine adapted for imparting a thrust to the drilling tool.

The inventors determined that there is a direct relationship between the electrical current supplied to the electrical engine and the drilling forces (torque or thrust respectively) applied by the engine to the drilling tool and that it is possible to obtain a direct equivalence relation through a conversion factor to obtain a value in Newtons (N) or N·m. The inventors determined that there is no need to obtain a real measurement of the torque or thrust—for example through a dynamometer—but that a directly representative measurement of the current supplied to the electrical engines is enough in a method according to the invention.

Measuring a current may be done with a sensor, e.g., an amp-meter, monitoring current applied to a motor(s) in a drilling tool. Sensors to measure current may be retrofitted to existing drilling machines to obtain a drilling machine according to the invention and implement a method according to the invention.

A plurality of values, called drilling values, may be acquired for a same drilling parameter while drilling a single bore.

The drilling values of a drilling parameter acquired while drilling a bore may be summed or integrated over the duration of the measurement. The result of the cumulative sum or integration provides a work value representative of a work for the drilling of this specific bore. The work value may be based on a sum or integration of the current applied by a motor in the drilling machine during the entire course of drilling a bore. The work value may also be based on an average value of sums or integrations of current for each of several drilled bores.

When the drilling parameter is an electrical current, the work value is the total electrical current consumed during the drilling of the bore.

The work value is related to the wear of the drilling tool, such that the wear of the drilling tool may be deducted from the work value.

Beneficially, a work value may be calculated for each drilling parameter. In particular, a torque work value may be calculated for the torque and a thrust work value may be calculated for the thrust applied to the drilling tool while drilling a bore.

The work values calculated may be stored in a memory of a control unit for the drilling machine.

One or more work value(s) may be used to determine at least one of the second rotational speed and the second feed speed for a subsequent bore.

A plurality of values, called drilling values, may be acquired for a same drilling parameter while drilling different bores. These drilling values acquired for a same drilling parameter while drilling different bores may be representative of the same of a different parameter than the drilling values mentioned above and acquired for a same drilling parameter while drilling a single bore.

Measuring the same drilling parameter during multiple drilling phases of multiple bores allow to measure and evaluate a tendency in the evolution of the drilling parameter. Moreover, this may also allow to eliminate incoherent values (singularities) that would be considered outside a normal range of values previously acquired. Furthermore, this may allow to determine a second rotational speed and/or a second feed speed based on drilling values acquired while drilling a plurality of "first" bores.

At least one of the second rotational speed and the second feed speed may be determined based on a plurality of drilling values.

The recorded values of the drilling parameter acquired over multiple drillings provides a history of the drilling tool that may be used to better determine the rotational speed and/or the feed speed for further subsequent drillings.

The determination of an evolution of the torque or thrust over the drilling of successive bores may be obtained by applying a curve fitting software to a series of drilling values or work values obtained during the drilling of these successive bores. In particular, an adaptive factor may be obtained by applying a line fitting software to such series of values, the adaptive factor corresponding to the gradient (or "slope") of the line obtained.

Such history of the drilling parameter over multiple drilling phases may also be used to better determine the initial rotational speed and/or the initial feed speed for subsequent drillings with other drilling tools of the same type.

In some embodiments, drilling values may be acquired for one or more drilling parameters during a first series of first bores, without modifying the rotational speed or feed speed applied to the drilling tool between each of the first bores of this series. This phase may be considered as a calibration phase to obtain a first reference for the adaptive fitting application.

The rotational speed and/or feed speed may be subsequently adapted to a recalculated second rotational speed and/or second feed speed based on the drilling parameter(s) measured while drilling the series of first bores.

When drilling the first bores with a new drilling tool, there is a steady wear region for this drilling tool at the predetermined first rotational speed and first feed speed, during which the drilling tool merely does not wear or wears in an inconstant manner. The number of first bores in the initial series of first bores for measuring drilling parameters without adjusting them is advantageously selected in this steady wear region, such that the drilling tool does not significantly wear from one "first bore" to another "first bore" of this initial series.

A method according to the invention may further comprise: mounting a new drilling tool in the drilling machine, and drilling a first series of bores without modifying any of the rotational speed and feed speed between consecutive bores.

This first series of bores comprises a predetermined number of bores. This first series allows to acquire a minimum amount of drilling values and/or work values before adapting the rotational speed and/or feed speed.

Determining at least one of a second rotational speed and a second feed speed may be performed only upon fulfilment of a predetermined criteria.

The determination of at least one of a second rotational speed and a second feed speed may be depending on a further criteria. For example if a drilling value representative of a torque above a predetermined torque threshold is measured, then a second rotational speed and/or a second feed speed may be determined and used for drilling a subsequent bore. However, if all drilling values representative of a torque are below the torque threshold while drilling a bore, the first rotational speed and the first feed speed may be maintained for drilling a subsequent bore.

The processing unit of the drilling machine may be adapted to proceed to such comparisons with values stored in a memory.

The value of the second feed speed is lower than the value of the first feed speed.

The inventors have noted that a method according to the invention leads to a diminishing feed speed along the life span of the drilling tool. This allows to maintain the drilling tool for a longer life span, and to maintain a high level of bore quality and repeatability.

The feed speed is proportional to the rotational speed.

When the feed speed and/or the rotational speed is(are) adjusted, the proportion between the feed speed and the rotational speed may change. For example the ratio of feed speed (meters/revolution) over rotational speed (revolution/second) resulting in a linear speed (meters/second) may diminish over the life span of a drilling tool.

A method according to the invention is adapted for being implemented on existing drilling machines without the necessity of any physical change on the machine architecture, as long as the machine has an independent engine for imparting thrust from the engine for imparting torque. The method is can be adapted to any machine type which has a control unit able to receive signals from one or more sensors measuring elect thrust imparted by the feed engine and torque imparted by the rotation engine.

The invention also extends to a drilling machine comprising: a drilling tool, a torque motor adapted to apply a torque to the drilling tool to rotate the drilling tool at a predetermined rotational speed, a thrust motor adapted to apply a thrust to the drilling tool to advance the drilling tool at a predetermined feed speed into a material, a control unit adapted to control the rotational speed of the torque motor and the feed speed of the thrust motor, at least one drilling sensor adapted to measure a drilling parameter representative of at least one of the torque and the thrust applied to the drilling tool, and a processing unit adapted to calculate at least one of a rotational speed and a feed speed based at least on the drilling parameter measured by the drilling sensor.

The control unit ensures that the rotational speed and the feed speed are at a predetermined setpoint. The control unit controls the power supplied to the torque motor and the thrust motor to ensure that the drilling tool rotates at a predetermined rotational speed and penetrates a material to be drilled at a predetermined feed speed. The control unit may comprises different parts, such as for example a sub-control unit dedicated to each engine. The control unit may receive signals from one or more sensors measuring the rotational speed and/or the feed speed of the drilling tool, to ensure a closed loop control of these parameters.

The drilling machine may beneficially comprise: a torque sensor for measuring a drilling parameter representative the torque applied to the drilling tool, for example an electrical current sensor placed on a cable for powering the torque motor; and a thrust sensor for measuring a drilling parameter representative the thrust applied to the drilling tool, for example an electrical current sensor placed on a cable for powering the thrust motor.

The processing unit may be adapted to perform all calculations mentioned in relation to a method according to the invention. In particular, the processing unit may be adapted to store values in a memory, calculate a work value based on an integration of drilling values, perform a linear regression based on a series of work values and obtain a slope for the obtained line, send new values for rotational speed and/or feed speed to the control unit.

The drilling sensor may be adapted to measure an electrical current supplied to the torque motor or to the thrust motor.

The invention also extends to other possible combinations of features described in the above description and in the following description relative to the figures. In particular, the invention extends to drilling machines comprising features described in relation to the drilling method; the invention extends to drilling methods comprising features described in relation to the drilling machine.

SUMMARY OF DRAWINGS

Some specific exemplary embodiments and aspects of the invention are described in the following description in reference to the accompanying figures.

DETAILED DESCRIPTION

Figure 1:
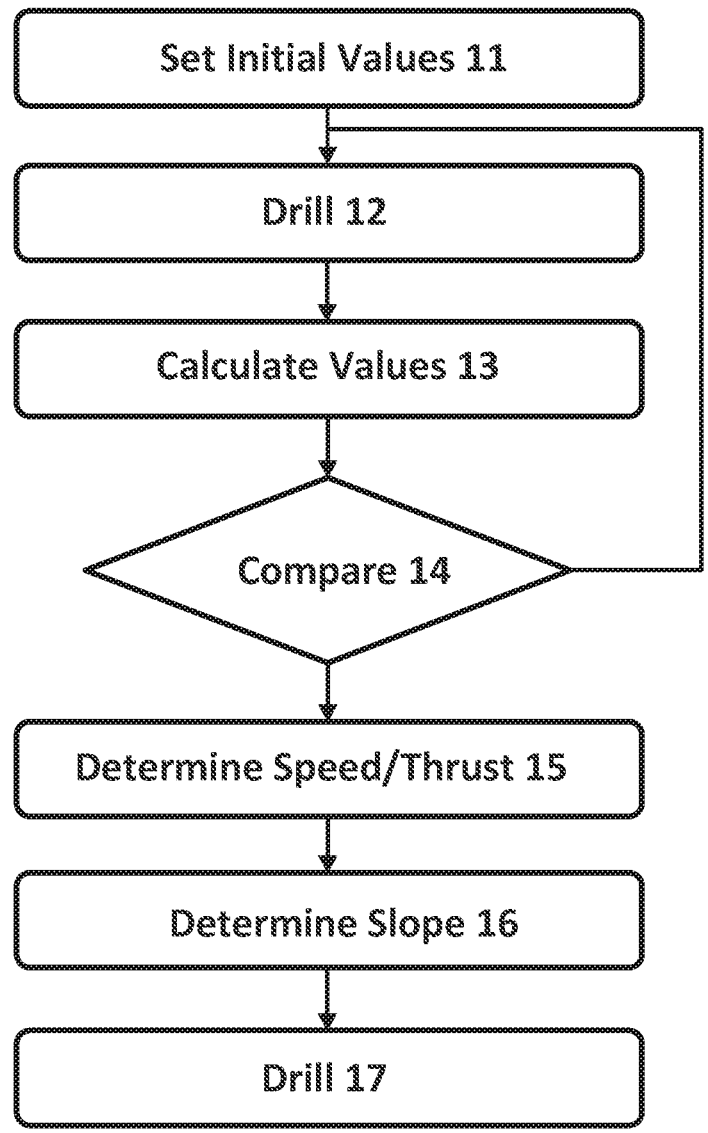
FIG. 1 is a schematic representation of steps of an embodiment of a drilling method according to the invention.
Figure 5:
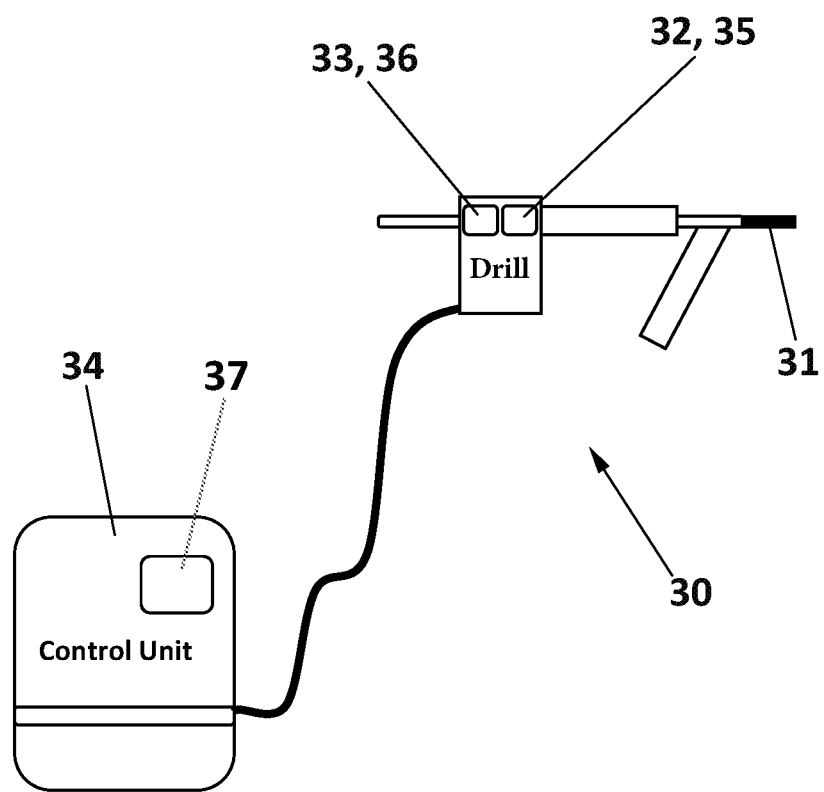
FIG. 5 is a schematic representation of a drilling machine according to the invention.

In FIG. 1, illustrates a drilling method which embodies the invention. This method can be implemented on a drilling machine as represented on FIG. 5, with a drilling tool (or drill bit) 31 for drilling a predetermined material. The drilling machine 30 comprises a torque motor 32 adapted to impart a torque to the drilling to make rotate the drilling tool. The drilling machine 30 further comprises a thrust motor 33 adapted to impart an axial thrust to the drilling tool 31 to make advance the drilling tool, or at least a forward tip of the tool, towards and into the material to be drilled. The drilling machine may further comprise a control unit 34 adapted to control the rotation motor and the feed motor.

Moreover, the drilling machine 30 comprises a torque sensor 35 adapted to measure the electrical power supplied to the torque motor 32. The drilling machine 30 also comprises a thrust sensor 36 adapted to measure the electrical power supplied to the thrust motor 33. The torque sensor 35 and the thrust sensor 36 may for example be ammeters which measure electrical current such as in amperes. The torque and thrust sensors 35, 36 may be incorporated respectively with the torque motor 32 and the thrust motor 33. The sensors 35, 36 may be incorporated at other positions in other embodiments, for example in the control unit 34.

The control unit 34 may also comprise a processing unit 37 to process signals obtained from the sensors 35, 36 to implement a method such as shown in FIG. 1. The processing unit 37 may include memory storing instructions to perform the method and store data such as measurements obtained from the signals from the sensors 35, 36, values of rotational speeds to be applied to a drilling tool and values of feed speeds to be applied to the drilling tool In step 11, set values of a first rotational speed and a first feed speed are determined. These set values may be determined based on experience or experiment. The set values may be determined by testing in laboratory. These set value may be provided by a manufacturer of the drilling tool used. In step 11, the set values are entered into the control unit, In step 12, which follows step 11, a bore is drilled in the material at the rotational speed and feed speed determined in step 11. The electrical currents supplied to the rotation motor and feed motor are measured, e.g. by sensors 35, 36, and recorded by the control unit. As previously mentioned, the electrical current consumed by the rotation motor and the feed motor is representative of respectively of the torque and of the thrust applied to the drilling tool. In this embodiment, the electrical current measured while drilling the bore is measured during the whole length of the drilling step.

Figure 2:
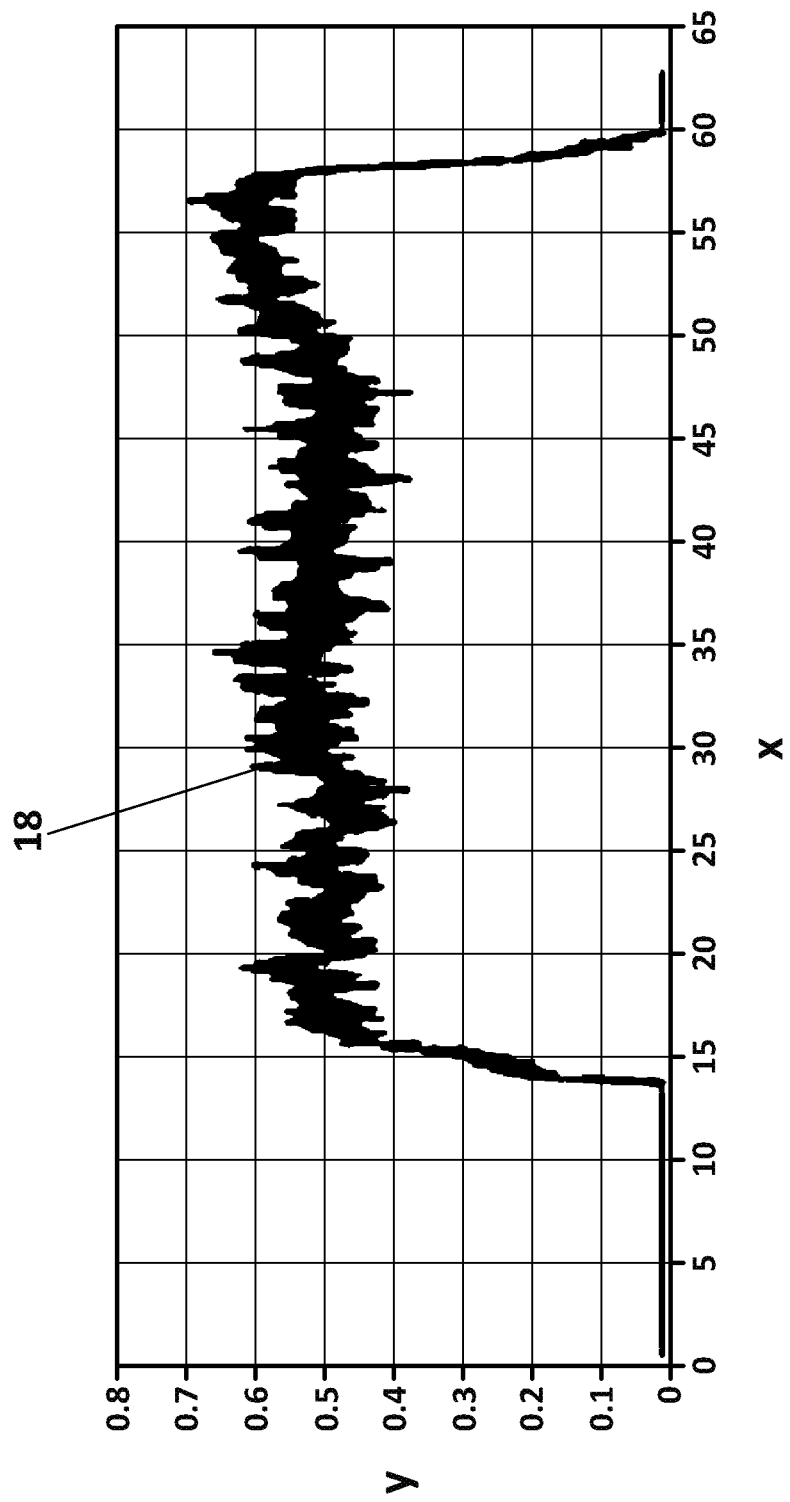
FIG. 2 is a schematic representation of a measurement of a drilling parameter while drilling a bore.

An exemplary result the measurement made in step 12 is represented on FIG. 2. Drilling values made of electrical current supplied to the feed motor while drilling a first bore are represented on the y axis. These drilling values are therefore representative of the instantaneous thrust applied to the drilling tool. The x axis represents the axial displacement of the drilling tool towards or in the material (or feed) in millimeters during this process. In particular, one may observe the feed at which the drilling tool's end first touches the material's surface, at about 14 mm, by a sudden increase of electrical current supplied to the rotation motor. One may also observe the feed at which the drilling tool's end exits the material, at about 58 mm, by a sudden drop of electrical current supplied to the rotation motor. The total feed stroke set for this drilling process would be about 63 mm. While drilling the first bore, the drilling values are within a range of 0.4-0.6, with a slight increase towards the end of the bore drilling (from 50 mm to 58 mm). These drilling values may be acquired by an ammeter, sent to a processing unit 37 of the drilling machine, and stored in a long-term or short-term memory.

In a third step 13 following step 12, a work value is calculated which is representative of a mechanical work developed to drill the first bore. A work value may be calculated for the rotation motor, and for the feed motor. The work value may be obtained by integration of the drilling values 18 acquired during step 2. The work values are calculated by the processing unit of the drilling machine based on the drilling values acquired during step 12 and as exemplarily represented in FIG. 2. The work values are stored in a long-term or short-term memory.

In a fourth step 14, the number of bores made with the drilling machine is compared with a predetermined number of first bores stored in a memory. Indeed, in some methods according to the invention, an initial series of first bores is made with a drilling tool in order to obtain sufficient initial data to adapt the rotational speed and feed speed for further drilling. As long as the number of bores drilled is inferior to the predetermined number of first bores, the steps 12, 13, 14 are repeated. A plurality of work values is thus stored in memory.

Figure 3:
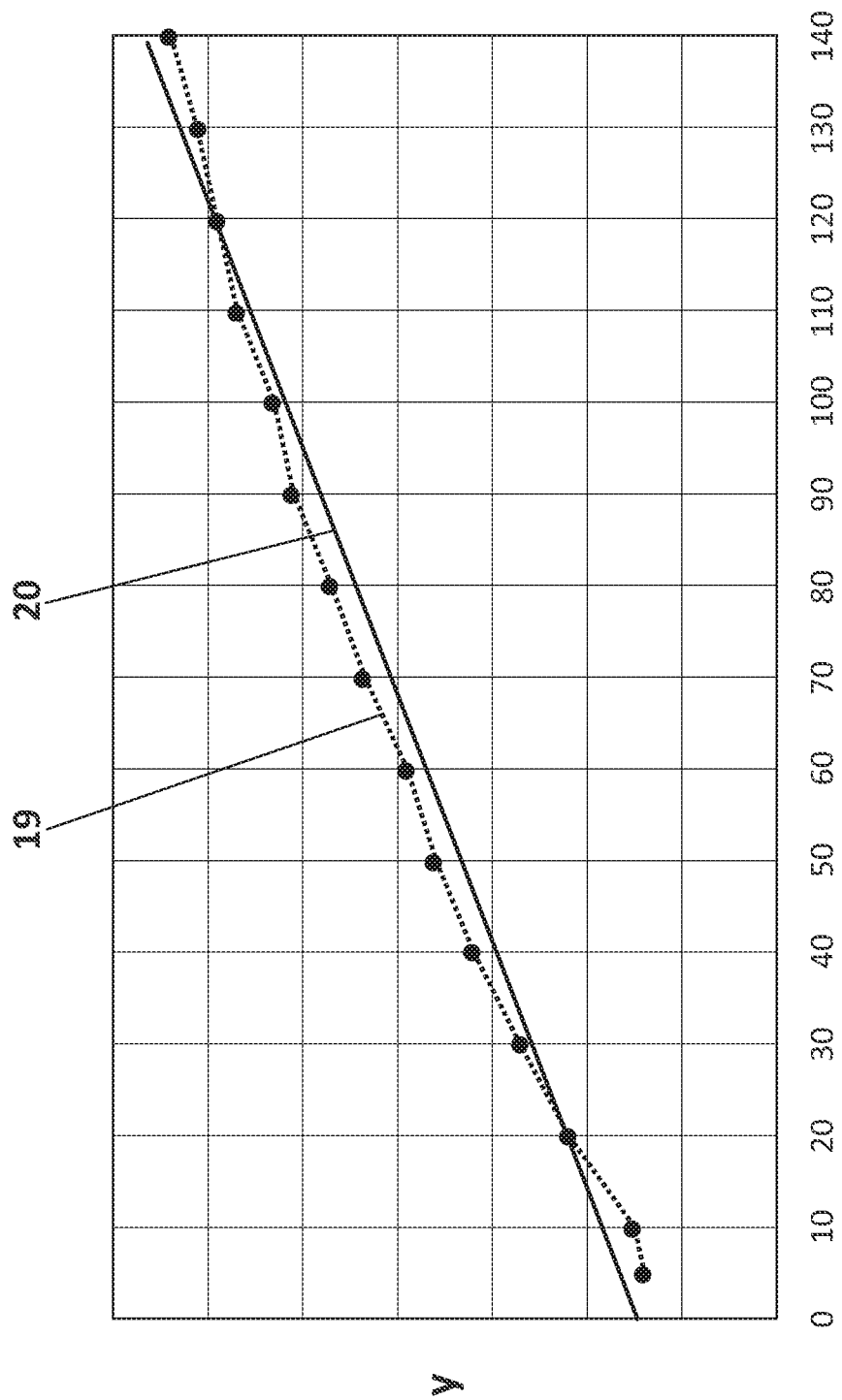
FIG. 3 is a schematic representation of processed measurements of a drilling parameter when drilling multiple successive bores.

In FIG. 3, multiple work values 19 are represented in dotted lines for successive bores drilled with a same drilling tool. These work values are represented along the y axis and are representative of the total thrust obtained for the drilling stage of each bore. The successive bores drilled are numbered in their drilling order, and this numbering is reflected on the x axis. In this example a hundred and forty successive bores were made. One may observe on this graphic that the mechanical work developed for the thrust of the drilling tool increases with the number of bores drilled with a same drilling tool. In the example shown in FIG. 3, the predetermined number of first bores from an initial series without modification of the rotational speed and/or feed speed between consecutive bores is of about five. Bores drilled after that number have therefore been made with adjusted rotational speed and/or feed speed.

When the number of bores drilled reaches the predetermined number of first bores, the step 15 is implemented.

In step 15, the processing unit 37 processes the work values obtained at step 13, and determines a second rotational speed and/or a second feed speed. In the exemplary embodiment of method described in relation to the figures, the processing unit implements a linear regression, for example with a best-fitting linear algorithm, to evaluate a slope of the successive work values. This best-fitting linear algorithm may be applied to a selection of work values (for example to exclude incoherent values), and/or on a predetermined set of values (such as for example on the last thirty work values), and/or to all values since the first bore drilled with the same drilling tool. In particular, the processing unit may select a range of work value among the latest acquired (for example the latest twenty work values) when a curve inflection is detected. The processing unit may thus first apply a curvilinear best-fitting algorithm to select a proper range of value to be processed for determining a line and its slope. Alternatively, a user may determine an arbitrary number of work values to be taken into account for applying a linear regression.

In this embodiment, step 15 allows to obtain a line with a slope. This line 20 is represented with a solid line in FIG. 3.

In step 16 following step 15, the slope of the line obtained in step 15 is extracted. The slope of the line obtained as a linear regression of the successive work values is called in the whole text "adaptive factor".

In step 17 following step 16, the processing unit 37 computes a second rotational speed and a second feed speed. The processing unit then replaces the first rotational speed stored in a memory with the second rotational speed and/or replaces the first feed speed stored in a memory with the second feed speed. The controller of the drilling machine will thus use this new set of rotational speed and feed speed as setpoint when drilling the subsequent bore.

When the adaptive factor is negative or stable, no change is made to the rotational speed and the feed speed. The second rotational speed may be equal to the first rotational speed and the second feed speed is equal to the first feed speed.

When the "adaptive factor" obtained is positive, at least one of the rotational speed and the feed speed may be reduced based on a function of an integral of the current over the course of a drilling process applied to at least one of the torque motor and the advancement motor.

By reducing the rotational spend or the feed speed for subsequent bores, the wear of the drilling tool is reduced and its life-span is extended.

Other parameters than the adaptive factor may be taken into account to modify the rotational speed and/or feed speed from one bore to another. For example, if the torque or thrust, e.g., the current applied to the thrust and advancement motors, measured during the drilling of a bore (measurement corresponding to FIG. 2) were to exceed a threshold—and more particularly if they were to briefly peak—the rotational speed and/or feed speed may be adapted consequently to avoid to reach such high values of torque or thrust when drilling the subsequent bore. In concrete terms, in such cases the rotational speed and/or feed speed may be reduced for drilling the following bore, even if the adaptive factor is negative or stable. The maximum torque and maximum thrust attained during the drilling of a bore may thus be maintained within acceptable values, such that the risk of breaking the material or the drilling tool is also reduced.

Moreover, the reduction in rotational speed and/or feed speed when the maximum torque or maximum thrust is high, or when the work required to drill successive bores is increasing, allows to maintain the same quality of the drilling step and thereby of the resulting bore, even with a worn drilling tool.

Figure 4:
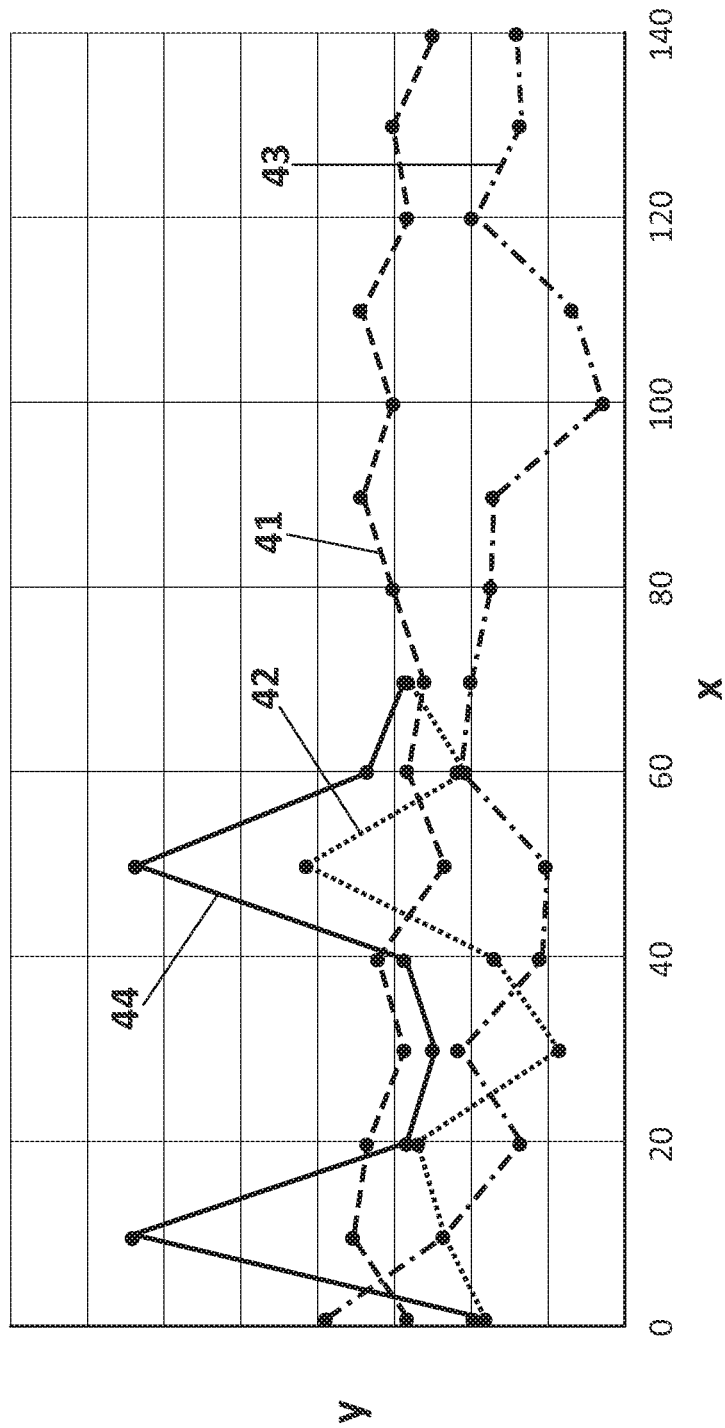
FIG. 4 is a schematic representation of comparative measurements of a parameter of drilled bores.

FIG. 4 shows results obtained by drilling successive bores in different conditions. On the x axis, the bores numbering is represented. On the y axis the diameter of the bores is represented as representative of the quality and homogeneity of the bores. No numbers are indicated on the y axis as the value is not relevant, but rather the variation from one bore to another.

The curves 41 and 42 were obtained by drilling bores in a titanium alloy. The curve 41 has been obtained by making use of a method according to the invention in which the rotational speed and/or feed speed is adapted from bore to bore, based on data obtained from previous bores made with the same drilling tool. On the contrary, curve 42 has been obtained by drilling bores with set rotational speed and set feed speed without variation from bore to bore. One may observe that the variation in the bores' diameters is much more limited when a method according to the invention is applied compared to when it is not: the curve 41 is "flatter" than the curve 42.

The curves 43 and 44 were obtained by drilling bores in an aluminum alloy. Similarly, the curve 43 has been obtained by making use of a method according to the invention in which the rotational speed and/or feed speed is adapted from bore to bore, based on data obtained from previous bores made with the same drilling tool. On the contrary, curve 44 has been obtained by drilling bores with set rotational speed and set feed speed without variation from bore to bore. One may observe that the variation in the bores' diameters is much more limited when a method according to the invention is applied compared to when it is not: the curve 43 is "flatter" than the curve 44.

Similar quality and homogeneity of multiple successive bores made with the same drilling tool by using a drilling method and a drilling machine according to the invention have also been measured and observed as regards to other parameters of the bores such as burr height, roughness, etc.

After step 17, the process continues for drilling further bores by following again the steps sequence 12 to 17 (excluding step 14).

In a method according to the invention, the drilling values and work values are reset each time a new drilling tool is mounted on the drilling machine.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A drilling method comprising:
    drilling a first bore in a material with a drilling machine by: (i) applying, using a torque motor of the drilling machine, a torque to a drilling tool to impart a rotation at a predetermined first rotational speed to the drilling tool, or (ii) applying, using an advancement motor of the drilling machine, a thrust to the drilling tool to advance the drilling tool at a predetermined first feed speed into the material,
    measuring electrical current applied to the torque motor or to the advancement motor during the drilling of the first bore,
    calculating a first value representative of the electrical current consumed by the torque motor or the advancement motor during the drilling of the first bore,
    determining a second rotational speed or a second feed speed based on the first value;
    drilling a second bore after the drilling the first bore, by applying: (i) a torque applied by the torque motion to impart rotation at the second rotational speed to the drilling tool, or (ii) a thrust applied by the advancement motor to the drilling tool to advance the drilling tool at the second feed speed into the material;
    measuring electrical current applied to the torque motor or the advancement motor during the drilling of the second bore,
    calculating a second value representative of the electrical current consumed by the torque motor or the advancement motor during the drilling of the second bore,
    calculating a third rotational speed or a third feed speed based on the second value, and
    drilling a third bore using the drilling tool in the machine, wherein the torque motor rotates the drilling tool at the third rotational speed or the advancement motor advances the drilling tool at the third feed speed.

2. The drilling method according to claim 1, further comprising:
    mounting a new drilling tool in the drilling machine, and
    drilling a first series of bores using the new drilling tool in the drilling machine by applying a torque to the new drilling tool to impart rotation at the second rotational speed to the new drilling tool, or a thrust to the new drilling tool to advance the new drilling tool at the second feed speed.

3. The drilling method according to claim 1, wherein the determining the second rotational speed or the second feed speed is performed in response to fulfilment of a predetermined criteria of the operation of the drilling tool.

4. The drilling method according to claim 1, wherein the second feed speed is slower than the first feed speed.

5. The drilling method according to claim 1, wherein the second feed speed is proportional to the second rotational speed.

6. A drilling method comprising:
    drilling a first bore with a drilling tool driven by a drilling machine that includes a torque motor rotates the drilling tool at a first rotational speed to form the first bore, or an advancement motor that advances the drilling tool at a first feed speed to form the first bore;
    measuring an electrical current during the drilling of the first bore applied to the torque motor or the advancement motor;
    calculating a first value representative of current consumed by at least one of the torque motor and the advancement motor to perform the drilling of the first bore;

calculating a second rotational speed or a second feed speed based on the first value, drilling a second bore using the drilling tool in the machine, wherein the torque motor rotates the drilling tool at the second rotational speed or the advancement motor advances the drilling tool at the second feed speed;

measuring an electrical current during the drilling of the second bore applied to at least one of the torque motor and the advancement motor;

calculating a second value representative of current consumed by at least one of the torque motor or the advancement motor during performance of the drilling of the second bore;

calculating a third rotational speed or a third feed speed based on the second value, and drilling a third bore using the drilling tool in the machine, wherein the torque motor rotates the drilling tool at the third rotational speed or the advancement motor advances the drilling tool at the third feed speed.

7. The drilling method of claim 6, wherein:

the calculation of the first value representative of the current includes integration of the current applied to the torque motor during the drilling of the first bore, or integration of the current applied to the advancement motor during the drilling of the first bore; and the calculation of the second rotational speed is based on the integration of the current applied to the torque motor, or the calculation of the second feed speed in based on the integration of the current applied to the feed motor.

8. The drilling method of claim 6, wherein:

the measuring of the electrical current during the drilling of the first bore includes measuring the electrical current applied to the torque motor and the current applied to the advancement motor;

the calculation of the first value representative of the current includes integration of the current applied to the torque motor during the drilling of the first bore, and integration of the current applied to the advancement motor during the drilling of the first bore; and the calculation of the second rotational speed is based on the integration of the current applied to the torque motor, and the calculation of the second feed speed in based on the integration of the current applied to the feed motor.

9. The drilling method according to claim 6, further comprising:

mounting a new drilling tool in the drilling machine, and drilling a first series of bores using the new drilling tool in the drilling machine by applying: (i) a torque to the new drilling tool to impart rotation at the second rotational speed to the new drilling tool, or (ii) a thrust to the new drilling tool to advance the new drilling tool at the second feed speed.

10. The drilling method according to claim 6, wherein the second feed speed is slower than the first feed speed.

11. The drilling method according to claim 6, wherein the second feed speed is proportional to the second rotational speed.

* * * * *